United States Patent [11] 3,565,248

[72] Inventor Sebastian Messerschmidt
 5 Altstadtstrasse, Schweinfurt, Germany
[21] Appl. No. 725,659
[22] Filed May 1, 1968
[45] Patented Feb. 23, 1971
[32] Priority May 11, 1969
[33] Germany
[31] M73940

[54] APPARATUS FOR PHOTOELECTRIC INSPECTION OF BALLS
 11 Claims, 4 Drawing Figs.
[52] U.S. Cl. ................................................ 209/73,
 209/111.7; 250/223; 356/196, 356/209
[51] Int. Cl. ............................................ B07c 5/342
[50] Field of Search .......................................... 356/196,
 209; 250/223; 209/111.7, 73

[56] References Cited
UNITED STATES PATENTS
2,354,628 7/1944 Whitesell, Jr. ................ 356/196X
2,701,055 2/1955 Strom, Jr. ...................... 356/196X
3,036,491 5/1962 Schier .......................... 356/196
3,187,893 6/1965 Silverman ..................... 209/111.7
FOREIGN PATENTS
689,792 4/1953 Great Britain ............... 356/196

Primary Examiner—Archie R. Borchelt
Assistant Examiner—C.M. Leedom
Attorney—Hane & Baxley ABSTRACT: Apparatus for photoelectric inspection of balls in which the balls are fed from a hopper to holes in a rotatable cylinder. The rotatable cylinder is indexed to carry the balls past scanning stations at which they are inspected by detectors. An eccentrically mounted driving cylinder located within the rotatable cylinder engages the balls at the scanning stations. The driving cylinder is rotated and axially reciprocated to apply to the balls two-directional motion. In a modification the driving cylinder is replaced by an endless belt which extends parallel to the axis of the rotatable cylinder and also has lateral reciprocatory motion applied to it.

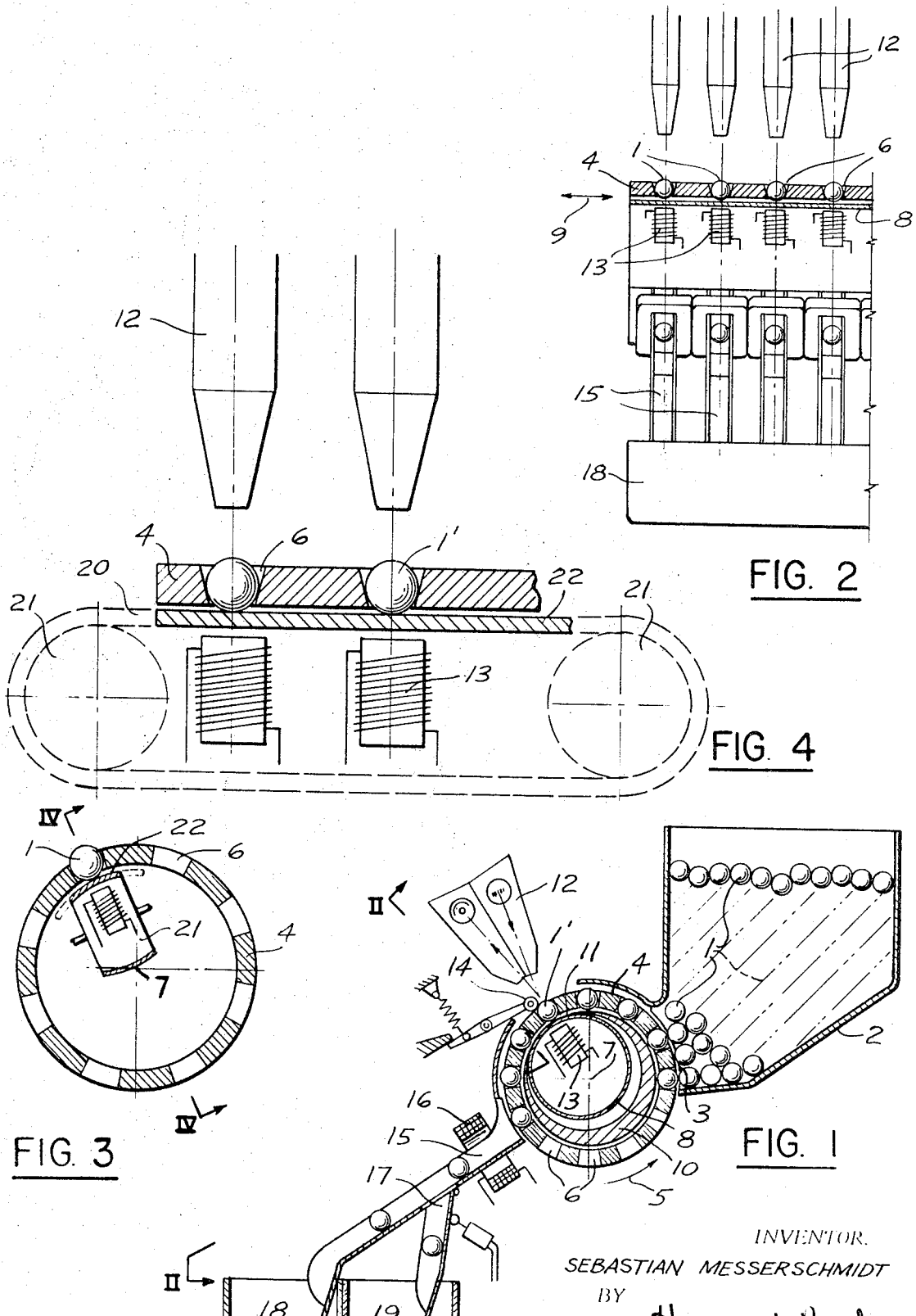

APPARATUS FOR PHOTOELECTRIC INSPECTION OF BALLS

The invention relates to apparatus for photoelectric inspection of balls.

The purpose of visual inspection is to eliminate from the production line balls which have surface flaws or defects. The introduction of fully automatic inspection has already brought about a considerable improvement in productivity and in the quality of inspection. In apparatus for inspection known in the art a single ball is rotated about an axis whilst the receiving element of an optical detector rotates about an axis normal to the axis of rotation of the ball, so that the entire surface of the ball is inspected in meridional bands.

In another arrangement that has been proposed the balls are conveyed on a turntable to a scanning station where they make contact with a backing roller and are rotated about two axes by revolving cones.

Another possible arrangement consists in gripping the balls at two poles and in swiveling the detector means so that the entire surface of the ball is scanned.

The capacity of such inspection systems is limited by the fact that only one ball can be inspected at a time.

It is an object of the present invention to eliminate this objection by providing apparatus which permits the inspection capacity to be multiplied.

According to this invention there is provided apparatus for photoelectric inspection of balls comprising a rotatable cylinder provided on two or more circumferential circles with holes for receiving and locating balls therein, means for indexing the cylinder so that the balls in the holes in a cylinder pass through scanning stations, a driving element which is located inside said cylinder for frictionally engaging and driving the balls and which is adapted to move in two angularly different directions, and at each scanning station, photoelectric detecting means for inspecting the balls.

Apparatus in accordance with this invention is not a mere duplication of a conventional arrangement inasmuch as despite its greatly increased capacity it requires only one driving element for the simultaneous inspection of a plurality of balls, the driving element being adapted to impart rotation to the balls in two directions and thereby providing an apparatus which is of simplified construction although its output capacity is increased.

In a preferred arrangement, the holes disposed on different circumferential circles are so disposed that they are aligned on lines extending axially along the rotatable cylinder.

The rotatable cylinder need not be circular and may for instance have a polygonal cross section.

The driving element may be a driving cylinder eccentrically located inside the said rotatable cylinder and rotatable about an axis parallel to that of the said rotatable cylinder, said driving cylinder also being mounted for axial reciprocatory motion.

Alternatively, the driving element may be an endless belt which extends inside the said rotatable cylinder parallel to the axis of the said rotatable cylinder, there being provided means for driving the belt, the belt also being mounted for a lateral linear or rotary reciprocatory motion perpendicular to the axis of the said rotatable cylinder.

If the driving element is a driving cylinder the principal movement of the balls is about axes parallel to the axis of the said rotatable cylinder. If the driving element is an endless belt the axes of rotation of the principal movement of the balls are tangential to the periphery of the rotatable cylinder. The secondary motion is roughly normal to the axes of rotation of the balls in each case. It is a matter of choice whether the belt is reciprocated in a linear lateral motion or in a rotary motion.

Preferably the apparatus comprises, inside the said rotatable cylinder, a segmental member which is gapped at the scanning stations.

The presence of this segmental member ensures that the balls are reliably carried to the scanning stations and cannot drop into the interior of the said rotatable cylinder if the diameter of the balls should be smaller than the diameter of the holes in the rotatable cylinder into which the balls are received.

Preferably the amplitude of the axial reciprocation of the driving cylinder or of the lateral reciprocation of the endless belt is at least equal to half the circumference of a ball.

This ensures that the entire surface of that ball is properly scanned by the detecting means.

In the interior of the driving cylinder or underneath the driving portion of the endless belt there may be provided, facing each detecting means, a magnet for pulling the balls into frictional contact with the driving cylinder or the belt.

This magnet may be arranged to extend under all the holes which have been indexed to the scanning stations. However, it is preferred to provide a separate magnet for each scanning station and the magnets may be either permanent magnets or electromagnets. Complicated press-down and holding means can thus be dispensed with, although such holding means may be provided, if desired or necessary.

For the purpose of removing any residual magnetism from the balls, the apparatus comprises demagnetization means at the outlet of the balls from the apparatus.

Preferably the outlet for the balls from each scanning station is provided with a two-way gate controlled by the detecting means associated with that scanning station.

Embodiments of this invention will now be described, by way of example only, with reference to the accompanying drawings in which:

FIG. 1 is a sectional elevation of a first embodiment;

FIG. 2 is a sectional elevation on the line II-II of FIG. 1;

FIG. 3 is a sectional elevation of a second embodiment, (the section is similar to that of FIG. 1); and, FIG. 4 is a sectional elevation on the line IV-IV of FIG. 3.

Referring to FIG. 1, balls 1 that are to be inspected are contained in a hopper 2 which has an elongated delivery opening 3 at its base.

In this embodiment the delivery opening 3 faces a rotatable cylinder 4 which is indexed in the direction indicated by an arrow 5 but details of the drive means are not shown. The wall of the cylinder 4 includes holes 6 distributed around several axially spaced circles. By referring to FIG. 2 it will be understood that axially adjacent holes 6 are aligned on common axially extending lines on the surface of the cylinder 4. The diameter of the holes 6 is at least equal to the diameter of the balls 1 that are to be inspected.

Eccentrically mounted inside the cylinder 4 for rotation about an axis parallel to the axis 7 of the cylinder 4 is a second cylinder 8 which makes contact with the surface of the balls 1' (the balls in the scanning positions are indicated in the drawings by the numeral 1') and imparts rotation to them about axes which are likewise parallel to the axis 7. Moreover, as indicated by an arrow 9, the cylinder 8 is also axially reciprocable. This movement of the inner cylinder 8 imparts another component of rotation to the balls 1' about an axis which is normal to the axis of rotation of the balls 1' as produced by the rotation of the cylinder 8.

Interposed between the cylinder 4 and the cylinder 8 is a stationary segment 10 which has an axial gap 11 underneath the balls 1' which have been indexed to the scanning stations where inspection takes place. In this position the balls 1' face photoelectric detectors 12 equal in number to the circles of holes 6 around the periphery of the cylinder 4 and each directing a scanning beam upon one of said circles.

In the interior of the inner cylinder 8 an electromagnet 13 is mounted below each of the balls 1' at the scanning position and each electromagnet 13 keeps the cooperating ball in frictional contact with the inner cylinder 8. In case of need this effect may be assisted by the provision of one or more holddown rollers 14.

Associated with each circle of holes 6 in the cylinder 4 is a delivery trough 15 or runout which passes through a demagnetizing coil 16. The delivery trough 15 incorporates a gate 17 which is controlled in conventional manner with reference to the result of the inspection of a ball in the scanning position by the respective photoelectric detector 12. As the balls are rotated about crosswise axes as previously explained, the scanning beam of the detectors automatically scans the entire surface of the balls as to size and configuration. This is not shown in detail because it forms no part of the subject matter of the present invention. The balls 1 are therefore delivered into one of two bins 18 or 19, according to whether or not the inspection has been satisfactory.

The rotating internal cylinder 8 can, as illustrated in FIGS. 3 and 4, be replaced by an endless belt 20 travelling over rollers 21 and associated with electromagnets located below that part 22 of the belt 20 which rotates the balls 1'. As indicated in FIG. 3 this belt 20 together with its rollers 21 is rotatably deflectable about the axis 7 of the cylinder 4. The amplitude of this rotary deflection equals half the circumference of the balls 1' to permit the entire surface of the balls to be scanned by the detector devices 12.

I claim:

1. An apparatus for simultaneous optical inspection of substantially the entire surface of a plurality of balls, said apparatus comprising in combination:

a rotatable hollow cylinder having in its wall a plurality of holes arranged in several axially spaced circular patterns, the diameters of the holes being such that at least a portion of each ball inserted into one of said holes for inspection protrudes from the inner wall of the cylinder;

a driving means located within the cylinder for frictional engagement with protruding ball portions, said driving means being arranged simultaneously to move in crosswise directions thereby causing engaged balls to rotate about two intersecting axes;

a stationarily mounted photoelectric detecting means for each of said axially spaced circular patterns, each of said detecting means directing a scanning beam upon the respective pattern to scan substantially the entire surface of balls inserted into the pattern holes rotary therein as said holes intersect the beam of the respective detecting means, the intersecting position of each hole constituting the scanning position of the respective hole; and means for indexing the angular position of the cylinder so that successive holes of each pattern are moved into scanning position with the respective detecting means.

2. Apparatus according to claim 1 wherein said driving means rotates about a single axis and travels in a linear direction parallel to its axis of rotation.

3. Apparatus as claimed in claim 1 wherein the driving means comprises a driving cylinder eccentrically located inside said cylinder having the holes, said driving cylinder being mounted for rotation about an axis parallel to that of said cylinder having the holes and also for axial reciprocation.

4. Apparatus according to claim 3 wherein said driving cylinder is a hollow cylinder, and wherein a magnet means for each of said hole patterns is stationarily mounted within said cylinder, each of said magnet means facing the respective scanning position for attracting balls passing said scanning position into frictional engagement with the driving cylinder.

5. Apparatus as claimed in claim 3, wherein the amplitude of the axial reciprocation of the driving cylinder is at least equal to half the circumference of a ball.

6. Apparatus as claimed in claim 1, wherein the driving means comprises an endless belt which extends inside said cylinder and includes a straight portion parallel to the axis of the cylinder and engageable with the balls, the apparatus also comprising means for driving the belt, said belt being mounted for rotational reciprocatory motion about the axis of said cylinder.

7. Apparatus as claimed in claim 6, wherein the amplitude of the rotational reciprocation of the endless belt is at least half the circumference of a ball.

8. Apparatus as claimed in claim 6, which comprises, underneath the straight portion of the endless belt, a stationary magnet means for each scanning position each of said magnet means facing the respective scanning position for pulling the balls into frictional contact with the belt.

9. Apparatus as claimed in claim 1 which comprises, inside said rotatable cylinder, a segmental member which is gapped at the scanning positions.

10. Apparatus as claimed in claim 1, which comprises outlet means for discharging balls from each of said patterns, and demagnetization means for degaussing balls upon discharge from the apparatus through said outlet means.

11. Apparatus as claimed in claim 10, wherein each of the outlet means for the balls is provided with a two-way gate controlled by the respective scanning position, one gate way accepting balls passing inspection and the other gate way accepting balls failing inspection.